United States Patent [19]

Yen et al.

[11] Patent Number: 4,707,841
[45] Date of Patent: Nov. 17, 1987

[54] DIGITAL DATA RECEIVER FOR PREAMBLE FREE DATA TRANSMISSION

[75] Inventors: Jui L. Yen; Rui Wang, both of Toronto, Canada

[73] Assignee: University of Toronto, Innovations Foundation, Toronto, Canada

[21] Appl. No.: 642,903

[22] Filed: Aug. 21, 1984

[51] Int. Cl.$^4$ ............................................. H04L 7/00
[52] U.S. Cl. .................................... 375/106; 375/118; 360/51
[58] Field of Search ................... 375/75, 95, 106, 118; 360/51; 364/577, 723

[56] References Cited

U.S. PATENT DOCUMENTS 4,295,222  10/1981  Van Uffelen .................... 375/106
4,453,259  6/1984  Miller ................................. 375/106

OTHER PUBLICATIONS

"Signal Processing Products and Technology"—Texas Instruments.
"Partial Response Signalling"—Peter Kabel and Subbarayan Pasupathy.
"Complex Analog Bandpass Filters Designed by Linearly Shifting Real Low-Pass Prototypes"—Adel S. Sedra, W. Martin Snelgrove and Ray Allen.
"Jointly Adaptive Equalization and Carrier Recovery in Two-Dimensional Digital Communication Systems'—D. D. Falconer.
"Fractional Tap-Spacing Equalizer and Consequences for Clock Recovery in Data Modems"—Gottfried Ungerboeck.
"Intermediate-Function Synthesis"—W. Martin Snelgrove
"Passband Timing Recovery in an All-Digital Modem Receiver"—Dominique N. Godard.
"Handbook of Mathematical Functions"—Milton Abramowitz and Irene A. Stegun.

Primary Examiner—Robert L. Griffin
Assistant Examiner—M. Huseman
Attorney, Agent, or Firm—Gerald J. Ferguson, Jr.; Michael P. Hoffman; Ronni S. Malamud

[57] ABSTRACT

A data receiving system for digital data communication described which uses asynchronous sampling and lagrangian or prolate spheroidal function interpolation on the received signal. A received analog signal is first asynchronously sampled, digitized stored in a memory and then processed using interpolation technique to recover the correct symbol timing of the symbols in the digitized data. The minimum sampling rate commensurate with channel band width is used. The correct symbol timing is continuously adjusted within certain predetermined limits of the interpolation interval using a "jumping" algorithm which permits continuous symbol tracking. The recovered symbols are then equalized to compensate for channel distortion and decoded to give the originally encoded data. When bursts of data are being transmitted the data stored in memory is replayed to ensure that all data in the data burst is used for communication and that there is no transmission overhead requiring extra symbols for synchronization. In a preferred embodiment of the invention the received signal is used to generate real and imaginary components which are then subjected to interpolation and, the interpolation is performed using a digital filter and is controlled by an algorithm which selects filter coefficients to recover the symbol timing. The data receiving system can be implemented in an all software receiver or implemented on a single integrated circuit and is suitable for transmission of short data bursts such as in TDMA (time division multiple access) particularly for satellite communications (intellsat), teletex and frequency hopping signalling.

27 Claims, 12 Drawing Figures

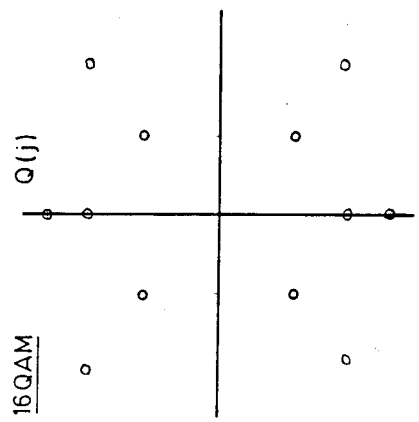
FIG. 2c  16 QAM
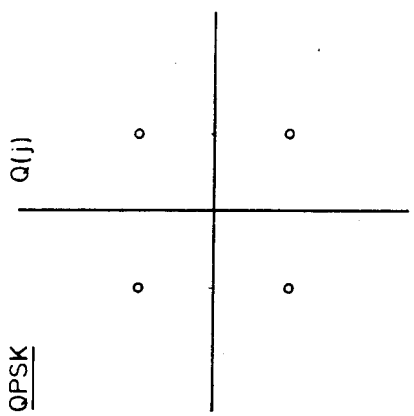
FIG. 2b  QPSK
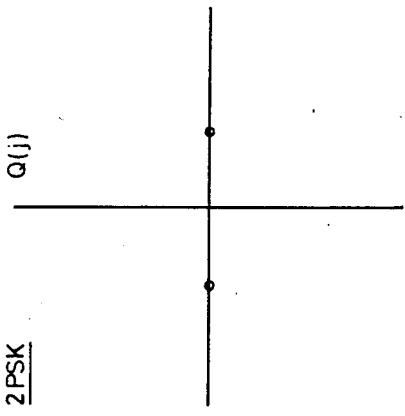
FIG. 2a  2PSK

DIGITAL DATA RECEIVER FOR PREAMBLE FREE DATA TRANSMISSION

SUMMARY OF THE INVENTION

The present invention relates to a digital data receiver for receiving an analog signal transmitted with encoded information, digitizing the received analog signal, and processing the digital signal to recover the encoded information.

With existing digital data receivers, received analog signals are sampled synchronously by means of a symbol clock recovered from the received analog signal using phase lock loops or other tracking schemes by which the clock is synchronised to that of the transmitted data. Synchronous sampling techniques can be implemented digitally in an all-software receiver but such an arrangement requires over sampling, which is many times higher than the minimum possible sampling rate, hence only low data rates can be handled. Also, with synchronous sampling, in an analog implementation, a certain length of signal, typically, at least 100–500 bits of data, depending on the modulation scheme, is required by the phase lock loop to initially recover the symbol clock and establish symbol timing at start-up. This means that during this time, the channel cannot be used to transmit data. Thus synchronous sampling is very limited, if not impossible where bursts with less than 100 bits or less are transmitted. Also, the data burst requires that synchronisation symbols be transmitted which results in a transmission overhead. Consequently this technique has limited application in situations where short data bursts are required, for example TDMA (time division multiple access) communications and military and security communications, and frequency hopping signalling. For high rate data bursts, the receiver operates at the rate of transmission during the burst but is idle otherwise. In addition, in a digital implementation, the high oversampling required places an upper limit on the data rate for hardware implementation, i.e. in a microprocessor based form, of an all software receiver and this means that equipment is invariably bulky and expensive.

An object of the present invention is to obviate or mitigate the aforesaid disadvantages.

In the present invention the problems with the prior art systems are overcome by firstly sampling the received signal asynchronously at the minimum sampling rate commensurate with channel bandwidth, digitizing the samples, and then storing the digital data in a memory, processing the stored data using interpolation techniques to recover the correct symbol timing and then decoding the symbols to retrieve the originally encoded data and, in the case of data bursts replaying the data stored in the memory to ensure that all the transmitted data is held for communication.

According to the present invention there is provided a data receiver system for processing a received analog signal which comprises data encoded with a plurality of symbols, the data receiver system comprising:

input means for receiving the analog signal;

sampling means associated with the input means for sampling the analog signal, said sampling means being coupled to asynchronous clock means connected to drive the sampling means;

analog to digital converter means connected to the output of the sampling means for digitizing sampled analog outputs to provide digital signals;

digital storage means connected to the output of the sampling means for storing said digitized data therein;

symbol acquisition means having a first input connected to the output of the storage means for acquiring said symbols from said digitized signals;

symbol acquisition control means having an input connected to the output of the symbol acquisition means, and an output connected to a second input of the symbol acquisition means, said symbol acquisition control means constituting means effective to obtain correctly timed symbols by interpolation;

decoder means having an input connected to the output of the symbol acquisition control means, said decoder means generating decoded digital data from said correctly timed signals, said decoder means having an output for outputting said decoded digital data.

In the case where data is transmitted in data bursts, it is replayed from the memory to ensure that all transmitted data is used for communications.

In a preferred embodiment of the invention the stored signal is processed to generate in-phase and quadrature components which are then passed through phase sliders which act as multi-tap interpolators to recover the symbol timing in the real and imaginary plane. The phase slider is controlled by a phase slider controller which implements an algorithm to determine whether correct symbol timing has been achieved. The recovered symbols are then passed through an equalizer where they are compensated for distortion which may have occurred during transmission and reception. The equalized symbols are then decoded to give the originally encoded binary information and this can be passed to a data terminal.

It will also be understood that the term interpolator used in its broadest sense will cover the term "phase-slider".

The data system is preferably implemented on a single custom-designed digital processor integrated circuit.

These and other aspects of the invention will now be described by way of example with reference to the accompanying drawings.

BRIEF DESCRIPTION OF DRAWINGS

FIGS. 2a, 2b and 2c are diagrammatic representations in the real and imaginary plane of different modulation systems for data transmission;

DESCRIPTION OF THE PREFERRED EMBODIMENT

Figure 1:
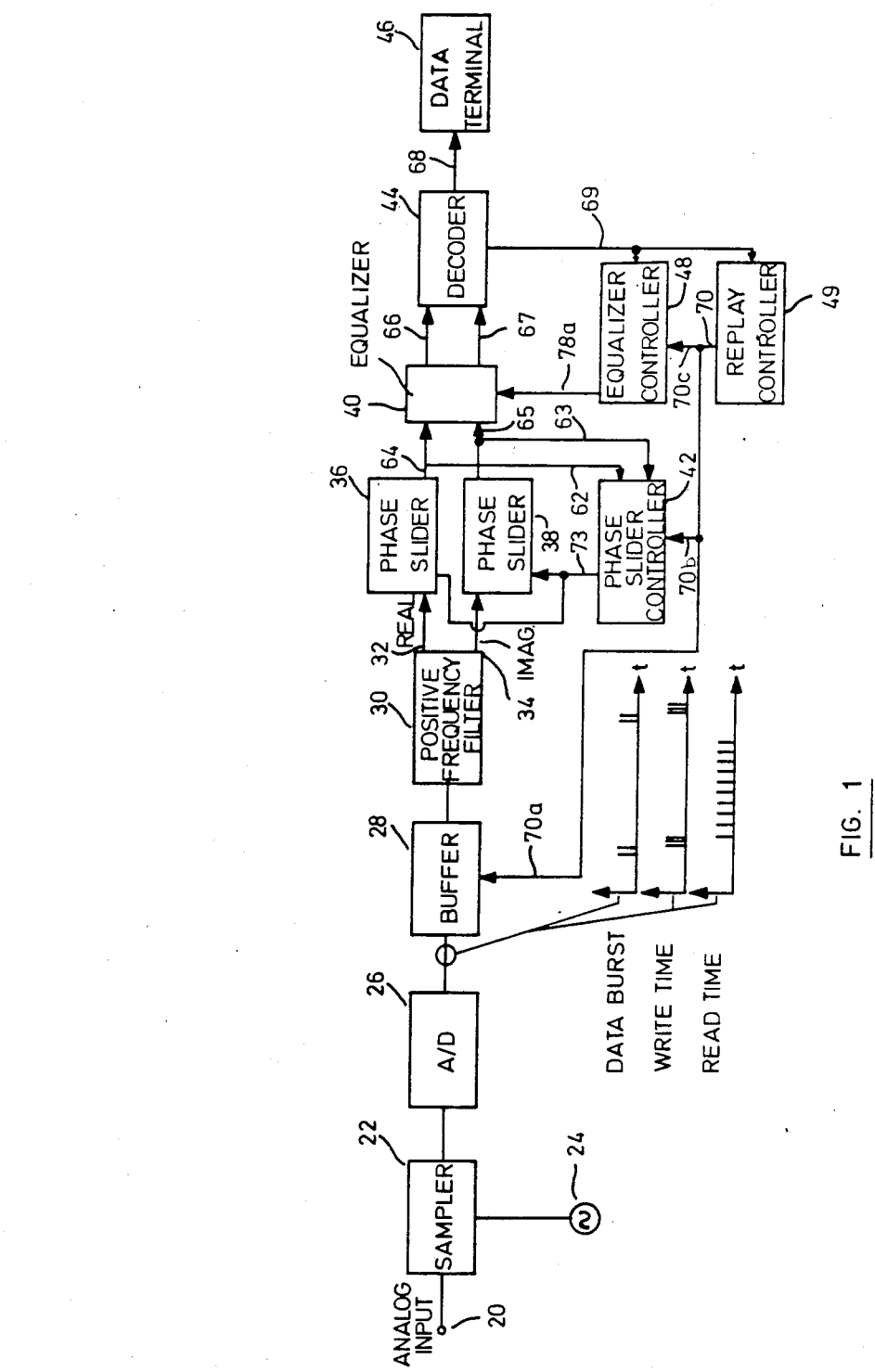
FIG. 1 is a schematic block diagram of a preferred embodiment of the invention used to process data bursts.

Reference is first made to FIGS. 1 and 2 of the drawings which illustrates schematically a block diagram of a preferred embodiment of the invention, and diagrammatic representations of different modulation system in the real and imaginary plane. The system of FIG. 1 processes data transferred by any of the systems shown in FIG. 2. FIG. 1 is considered in detail, but reference will be briefly made to the modulation systems of FIGS. 2a, 2b, and 2c to provide a more complete background to the system described.

FIG. 2a illustrates a 2PSK (Phase-Shift Keying) system which is the simplest system and in this signal constellation bits 1 and 0 lie on the real axis (R) of the R-Q(j) plane. FIG. 2b illustrates a more complex modulation system called QPSK (Quadrature Phase-Shift Keying) and in this signal configuration 4 symbols are arranged in the R-Q(j) plane as shown. The 2PSK and QPSK systems can transmit up to 1200 baud using a telephone line (bits per sec). In the QPSK system, one symbol out of the 4 symbols can be used in encode/decode 2 binary digits and this gives a twofold saving in bandwidth.

FIGS. 2c shows a 16 QAM (Quadrature Amplitude Modulation) system which has a signal constellation of 16 symbols. Each symbol can represent up to 4 bits and this modulation system permits faster data rates up to 9600 baud using telephone lines.

The block diagram shown in FIG. 1 can be used with any of these modulation systems but is designed to work with the 16 QAM system shown in FIG. 2c for faster data transmission rates.

Referring to FIG. 1 an encoded analog input signal is received at an analog input 20 and is then sampled by the sampler 22 which is driven by an asynchronous oscillator 24. The sampler analog signal is digitized by an analog to digital converter (A/D) 26 and the digitized signal is read into a buffer memory 28 at a rate at most twice the data burst transmission rate. Data is read out of the buffer memory 28 at a much lower rate because there is usually a relatively long time between data bursts ie if the duty cycle ratio is 1:10 (ratio of duration of data to no data) then data can be read out from the buffer memory at a much slower rate.

The data read out is passed to a positive frequency filter 30, (a type of complex filter, as is shown in the art) which filters the digitized signal such that it generates an imaginary component from the real component and outputs on separate conductors 32,34 real and imaginary symbol values of the digitized input data. The real and imaginary symbols are passed to phase sliders 36,38 respectively. The function of the positive frequency filter 30 can be combined with the phase sliders 32 and 34. Alternatively, an analog positive frequency filter can be used prior to the sampler 22, in order to use the minimum possible sampling rate (then Nyquist rate, as is known to those skilled in the art). In this case units 22, 26 and 28 need to be duplicated. A phase slider functions as an interpolator, as will be later described with reference to the alternative embodiment, and is software implemented and uses 12 taps (i.e., 12-point interpolation) to provide better control by compensating for errors in the signal amplitude-frequency spectrum. The outputs of phase sliders 36,38 are connected to a complex equalizer 40 via conductors 64, 65, which compensates the signals for channel distortion and to a phase slider controller 42 via conductors 62, 63 which in turn has an output 43 connected to each phase slider for adjusting the phase slider 36,38 to identify and provide correct symbol timing as will be later described.

The outputs 66 and 67 of the equalizer 40 are fed to a channel decoder 44 which decodes the correct symbols into 'bits' and this data is transferred to an output data terminal 46 via conductor 68 and to an equalizer controller 48 and a replay processing controller 49 via conductor 69. The equalizer controller 48 has an output 48a fed back to the equalizer 40 and senses the shape of the bits and adjusts the shape of the bits via the equalizer 40. The replay processing controller has outputs leading to each of the buffer memory 28 via conductor 70a, the phase slider controller 42 via conductor 70b and the equalizer controller 48 via conductor 70c.

Figure 3:
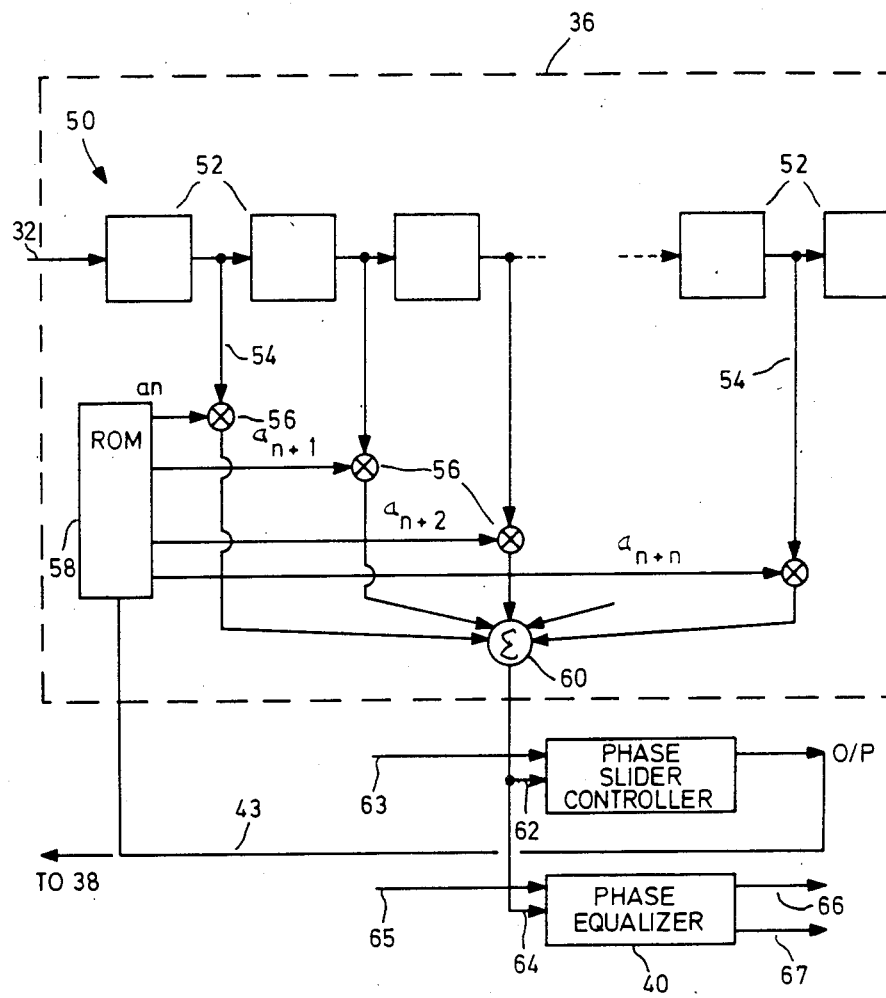
FIG. 3 is a diagrammatic representation of a part of the block diagram shown in FIG. 1.
Figure 4:
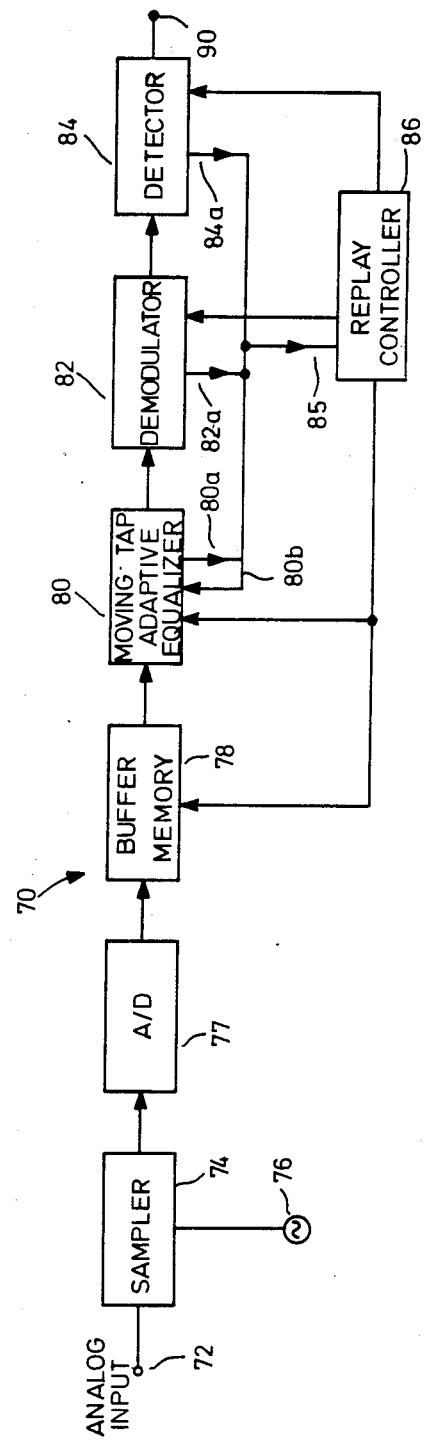
FIG. 4 is a general block diagram of an alternative embodiment of the invention used to process data bursts.

The operation of the phase sliders 36, 38 and phase slider controller 42 will now be described with reference to FIG. 3. Real and imaginary symbol data is fed into the controller 42 which, by way of a software algorithm based on the method known in the art as "Pass-band Timing Recovery", tests the symbols to determine whether the symbol timing of the phase sliders is correct. One implementation is illustrated for the real symbols, and although not fully illustrated, it will be appreciated that there is a similar implementation for phase slider 38 for the imaginary symbols. The real symbols received by phase slider 36 on conductor 32 are passed through a digital filter, which is generally denoted by reference numeral 50 and is a type of finite impulse response filter as is known in the art. The digital filter 50 comprises a plurality of serially connected sample registers 52 each of which has a filter tap output 54 which is fed to respective multiplication nodes 56 where they are combined with coefficients $a_n$, $a_{n+1}$, etc. The coefficients $a_n$, $a_{n+1}$, etc. are obtained from reading data stored in look-up tables stored in a Read-Only-Memory (ROM) 58. The filter tap outputs 54 combined with the appropriate selector coefficients are added in a general summation node 60 to form a composite output signal which is passed to the phase slider controller 42 by conductor 62 and to equalizer 40 by conductor 54. The output of controller 42 provides an input "read" signal on conductor 43 for the read-only-memory 58, the outputs of which are the coefficients $a_n$, $a_{n+1}$, etc.

The phase slider controller 42 also contains an averaging algorithm which averages all of the data values emerging from the phase sliders 36, 38; if the average result is zero then the symbol timing is correct. However, if the algorithm does not collapse to zero the sampling and symbol timing is incorrect.

Figure 6:
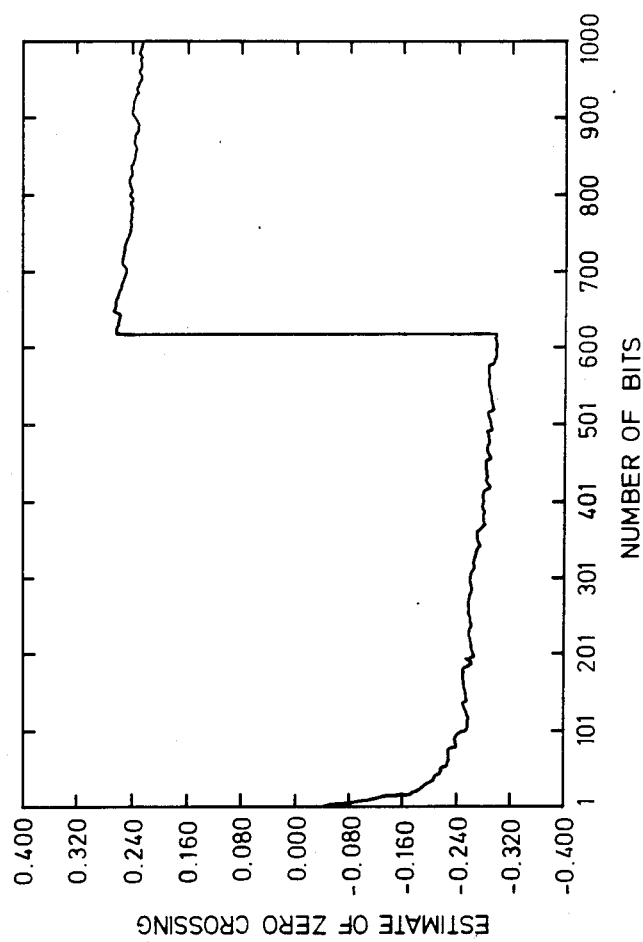
FIG. 6 is a graph of estimate of zero crossing versus number of bits received for a 1000 bit simulation showing the effect of the "jumping" algorithm.

The phase sliders 36, 38 are continuously adjusted so that 'tracking' symbol timing is obtained using a 'jumping algorithm' as will be later described with reference to FIG. 6.

When the correct symbol timing is obtained the symbols are processed as explained by equalization and then decoded. The decoded bits are then transferred to the data terminal 46, and also used to update the equalizer in order to optimize distortion compensation via the equalizer controller 48.

When the system is arranged to receive bursts of data, the replay processing controller 49 sequentially enables each of the buffer memory 28, the phase slider controllers 36, 38, the equalizer controller 40 and the channel decoder 44 such that a leading section of the digital signal is repeatedly processed in order to establish the correct symbol timing, equalization and demodulation. The replay processing controller 49 monitors signals from decoder 44 via conductor 69, and when the correct symbol timing is detected, an instruction to the buffer memory 28 is given via conductor 70a to replay the entire signal, so that the data burst may be processed with essentially no timing error. Control signals are also sent by the replay processing controller 49 to the phase slider controller 42 via conductor 70b and to the equalizer controller 48 via conductor 70c to control in the processing of the replayed burst of data.

The alternative embodiment is illustrated in FIGS. 4-9. The receiver arrangement is generally denoted by numeral 71. An analogue input signal 72 is sampled by a sampler 74 which is driven by an asynchronous oscillator 76, the sampled signal is converted to a digital signal by an analog to digital converter 77 and is stored in a buffer memory 78. When the buffer memory 78 is read, the signal is passed through a moving tap adaptive equalizer circuit 80 to compensate channel distortion described in more detail later, to a carrier demodulator 82 and an interpolation detector 84 also described in more detail later. The equalizer 80, carrier demodulator 82 and detector 84 have status outputs 80a, 82a, 84a which respectively convey information concerning the channel distortion, carrier phase and symbol timing error via data bus 85 to a replay processing controller 86. The replay processing controller in turn has outputs 86a, 86b, 86c and 86d of which output 86b serves to shift, the moving tap adaptive equalizer 80, while outputs 86a, 86c and 86d enable and update the buffer memory 78, the carrier demodulator 82 and the interpolation detector 84 respectively.

In addition, the detector 84 and the demodulator 82 are coupled via conductor 80b to the equalizer 80 in order that the updates may be made to the equalizer 80 as will be described. When the system is arranged to receive bursts of data the replay processing controller 86 allows a section of the data signal to be repeatedly processed so as to establish correct symbol timing, equalization and demodulation. When the correct data is detected by the replay processing controller 86 an instruction is given to the buffer memory 78 via conductor 86a to replay the entire signal, and recovered data is sent to the output 90 of the interpolation detector 84.

In operation, in the burst mode, the asynchronous clock 76 samples the entire data burst without requiring clock synchronization so that the input analog signal is digitized and is immediately written into the buffer memory 78. The interpolation detector 84 permits correct symbol timing to be obtained, and this, in turn controls the carrier demodulator 82 and serves as a reference for the moving tap adaptive equalizer 80. The status of the symbol timing error measured by the detector 84, and the carrier frequency sensed by the demodulator 82 are conveyed to the equalizer 80 via conductor 80b, in order that the equalizer can be properly updated. When correct symbol timing has been obtained, the equalizer has converged and the carrier has been acquired, the replay processing controller 86 instructs a complete replay of signal and sends valid decoded data to the output 90 in the time between the bursts.

Referring now in more detail to the components of the circuit, interpolation detection in the interpolation detector 84 is performed by selecting a certain signature of the undistorted signal such as zero-crossing, in $1+D$ partial response signalling, capable of symbol timing detection and which can be used for timing recovery. The correct symbol timing is first estimated using an iterative inverse Lagrange interpolation, which is a well documented mathematical technique. With this iterative inverse interpolation, a "time" is first selected from a specific value of signal for a zero-crossing inside the interpolation interval.

When the asynchronous sampling clock does not drift too fast in relation to the symbol clock, averaging can be used for enhancing the accuracy of symbol timing or zero-crossing time estimation. The signal at the estimated correct symbol time or zero-crossing time, i.e. the time found by an iterative inverse interpolation is then determined by Lagrange interpolation. Because the asynchronous signal samples are stored, they are available for multipass repeat processing using more accurate estimates of symbol timing and with enhanced equalization. The accuracy of interpolation mainly depends on the ratio of asynchronous sampling rate to symbol rate and, as a result, over-sampling is necessary. As a compromise between simplicity in interpolation detection and low sampling rate, double oversampling with three point interpolation in $1+D$ partial response signalling appears most efficient. Over-sampling becomes a disadvantage only when the data transmission rate is so high that analog to digital conversion becomes difficult.

Figure 5:
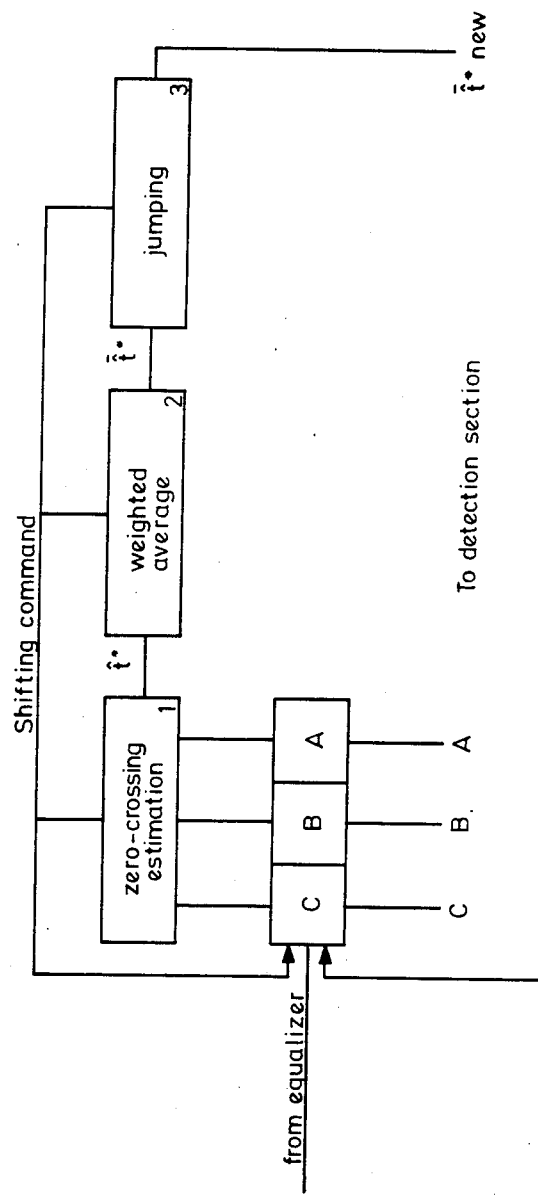
FIG. 5 is a schematic diagram of the algorithm infrastructure for the interpolation detector shown in FIG. 4.

Three algorithms are used in interpolation detection as shown in FIG. 5. Algorithm (1) is used to estimate zero-crossing, while algorithm 2 is used to enhance the accuracy of symbol time estimation, and algorithm 3 implements continuous zero-crossing tracking. An iterative zero-crossing point estimation algorithm (1) estimates the zero-crossing point of a signal and tracks it in a certain interval (say $-0.3, 0.3$) of the sampling interval; algorithm (2) decreases the zero-crossing estimation error variance by averaging and algorithm (3) shifts the zero-crossing forward or back by one sample when it appears to be intending to move out of the above interval.

The algorithm (3) to permit the tracking of symbols is designated a "jumping" algorithm. This is necessary when the zero-crossing point may shift out of the interpolation interval, which could preclude the possibility of giving an adequate zero-crossing estimate. The jumping algorithm solves this problem by keeping the zero-crossing in the middle range of the interpolation interval, say ($-0.3$ and $0.3$) and also jumps forward or backwards by one sample if the zero-crossing moves out of the range. FIG. 6 shows the effect of the jumping algorithm in a 1000 bit simulation with the "jumping forward" algorithm in operation. The interpolation detector also converts samples A, B and C into valid binary data by way of a detection section that produces either a logic "1" or "0" depending on the nature of each sample.

In an ideal $1+D$ channel, the performance of asynchronous sampling is satisfactory. However, when channel distortion is present an equalizer is necessary for either synchronous or asynchronous sampling. The equalizer must also be a fractional tap spacing equalizer since every sample has to be recovered to its undistorted value. The fractional tap spacing used here is T/2 where T denotes symbol spacing and in this case has to have an output at each T/2 interval.

Figures 7A, 7B:
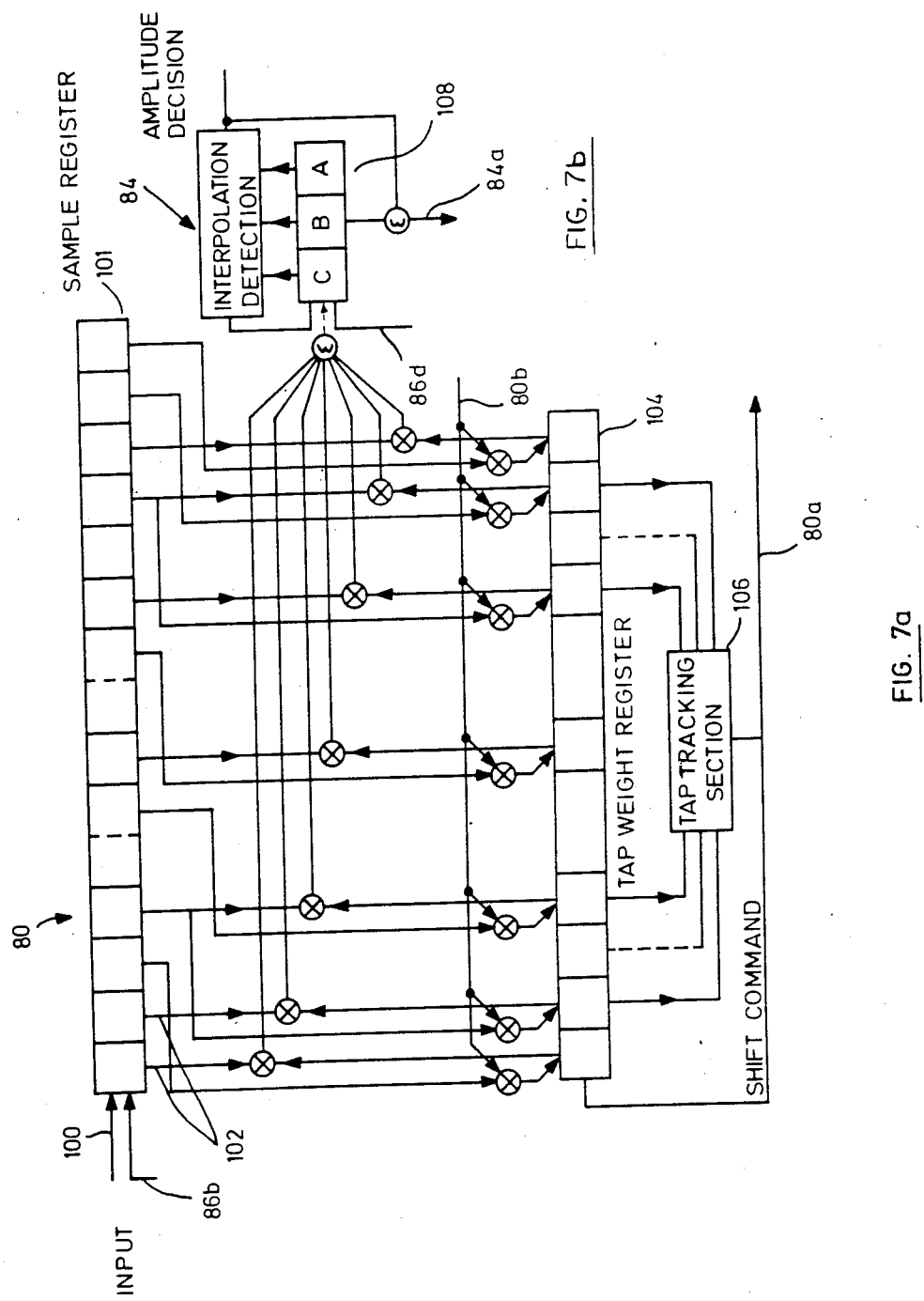
FIG. 7a is a block diagram of one implementation of a moving tap adaptive equalizer shown in FIG. 4.
FIG. 7b is a block diagram of one implementation of an interpolation detector shown in FIG. 4.

FIG. 7a shows an implementation of a moving tap equalizer 80 a type of fractional equalizer. The input sample 100 from the buffer memory 78 is fed into a sample register 101 and the register outputs 102 are fed to a tap-tracking section 106 via a tap weight register 104, the value of a tap weight reflecting its contribution to recovering the desired channel.

The tap coefficients are updated by adding the scaled product of the output of sample register 101, and the decision amplitude error to the previous tap weights. For the modulated signal, the decision amplitude error is modified according to carrier phase estimates. The equalizer is operated in accordance with a predetermined algorithm, which first tests whether the average of the difference of the leftmost weights and the rightmost weights is less than or greater than a certain number, e.g. 0.05. This depends on the equalizer length N, and noise level, and the average is taken by the weighted average algorithm.

If the left weight, $W_{left}$ is greater than $W_{right}$ the equalizer is shifted to the right side by one fractional tap, i.e. T/2 spacing. Conversely, if the $W_{right}$ is greater than $W_{left}$ the equalizer is shifted to the left side by one T/2 spacing. When the equalizer weights are shifted the weights and signal are aligned by advancing and delaying the execution of the command, placing the input samples 100 in the sample register 101.

The replay processing controller 86 uses a zero-crossing estimation replay with a replay length of about 50 bits, the replay length is referred to as the number of bits which are processed in the first pass and the least replay length is referred to as the smallest replay length by which the zero crossing can be found after a certain number of replays.

Figure 8:
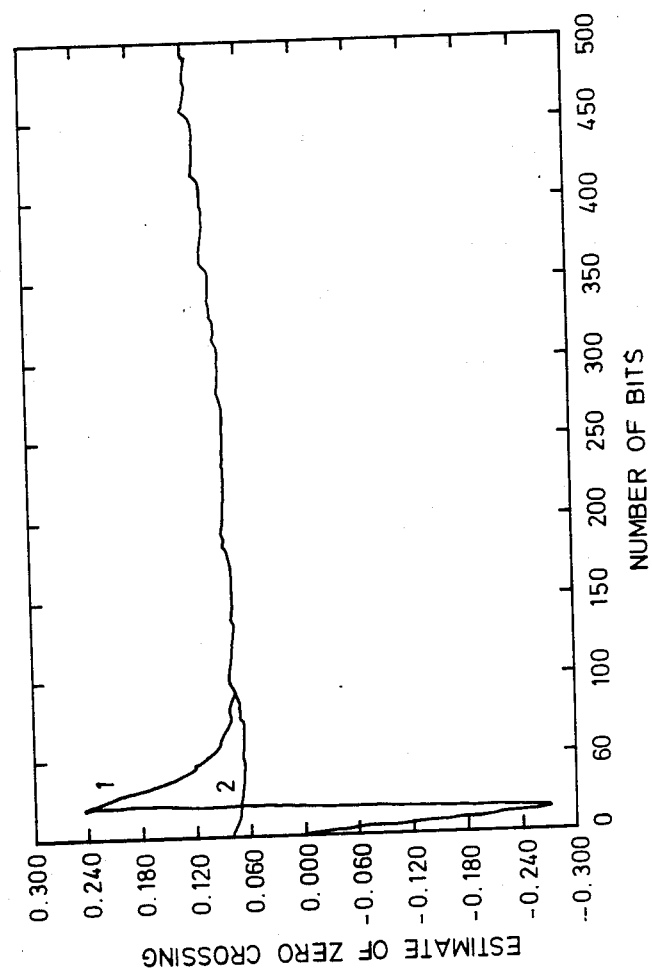
FIG. 8 is a graph of zero-crossing estimation versus number of bits for one technique, received when the initial zero-crossing is −0.45 showing the 'first pass' and the 'replay'.
Figure 9:
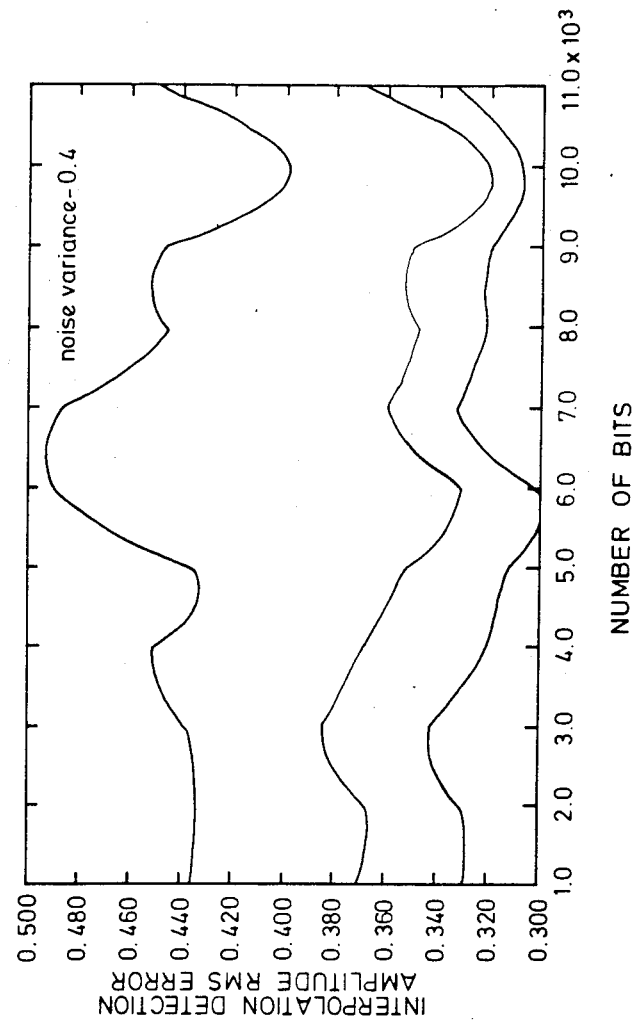
FIG. 9 is a graph of the interpolation detection amplitude error versus number of bits showing the effect of the number of replays on the error for the diagram shown in FIG. 4.

FIG. 8 shows a 500 bit simulation for the worst case with the initial sampler phase being −0.45. During the first play of the first 100 bits of data, the initial error in the estimate of zero crossing is reduced to around 0.080 as is shown in curve 1. With the zero crossing estimation error reduced to essentially zero, the processing of data may begin upon replay of the first 100 bits and continue throughout the 500 bit data burst. In practice, in order to avoid loss of data before the moving tap adaptive equalizer weights have converged, firstly, a replay with a replay length of 100 bits is carried out and the resulting equalizer weights are kept for the initial weights of the next pass. Secondly, several replays are performed and decisions are made during the last replay and the resulting weights from the last equalizer are then discarded. For the next hundred bits these first and second steps are repeated until the equalizer converges in the first pass plays as shown in FIG. 9. The amplitude error with no replay is shown in curve 1, with one (1) replay in curve 2 and with nine (9) replays in curve 3.

The entire system of the preferred and alternative embodiments can be realized on a single chip (Texas Instruments TMS 320 Digital Signal Processor Chip) using bipolar or any other technology suitable for handling data transfer rates up to 9600 baud on telephone lines. For very high data rates ie up to 120M bits/sec., ie such as those used in Intellstat Communications, the system could be implemented in discrete form because it is unlikely that with present generator semi-conductor technology chips are available which could handle such data rates.

TMDA systems are generally applicable in light duty cycles because of relatively low data rates. However the embodiments disclosed here can be combined in parallel to handle heavier duty cycles. Thus this arrangement can also be implemented in chip format and make the data receiver system flexible.

It should be understood that various modifications may be made to the embodiments described herein without departing from the scope of the invention. For example in the preferred embodiment, a plurality of such systems could be connected in parallel and the number of taps used could vary eg. 7 to 12 depending on different implementation, i.e. 7 taps would give faster processing but be less accurate than 12 taps. Also, in th alternative embodiment, the moving tap adaptive equalizer may be omitted if channel equalization is unnecessary and carrier demodulation is not required for baseband pulse amplitude modulation (p.a.m.) transmission. In addition, in both of the examples given the system is implemented using bursts of data but it should be understood that the system could equally well be used for continuous reception of data transmission in which case replay of the data would not be essential.

Advantages of the present invention are that an entire data burst can be used for information transmission thereby allowing much shorter data bursts to be used resulting in more data for a given cost i.e. charge per customer is reduced as some data takes less time. Cost is almost an order of magnitude less than existing systems. After sampling between data bursts, the signal can be processed relatively slowly between bursts, thus allowing the system to be realised on custom designed I.C's. Because sampling is at most twice the symbol rate, microprocessor implementation can be utilized to higher data rates. Asynchronous sampling permits replay of the stored samples and consequently the start-up time of the asynchronous sampling is almost zero. Because lower data rates are used in processing reliability of decoding is greatly increased. The invention has application in; implementation of low duty cycle time division multiple access satellite communication (Intellstat); receiver for vertical blanking interval teletex transmission such as the Telidon; new forms of secured communications in the military and security fields; and incorporation in low rate low cost modem for data transmission. The hardware required to be used to implement the system is small leading to a portable unit, and available integrated circuits in the processing of the data can be used in the hardware implementation.

We claim:

1. A data receiver system for processing received analog signals which comprise data encoded with a plurality of symbols, the data receiver system comprising:
   input means for receiving the analog signal;
   sampling means associated with the input means for sampling the analog signal, said sampling means being coupled to asynchronous clock means connected to drive the sampling means, the asynchronous clock means being unsynchronised with the data transmission rate of said analog signal;
   analog to digital converter means connected to the output of the sampling means for digitizing said sampled analog signal to provide a digital signal;

digital storage means connected to the output of the analog to digital converter means for storing said digital signal therein;

symbol acquisition means having a first input connected to the output of the storage means for acquiring said symbol information from said digital signal;

symbol acquisition control means having an input connected to the output of the symbol acquisition means, and an output connected to a second input of said symbol acquisition means, said symbol acquisition control means constituting means effective to obtain correctly timed symbols by interpolation;

decoder means having an input connected to the output of the symbol acquisition means, said decoder means generating decoded digital data from said correctly timed symbols, said decoder means having an output for outputting said decoded digital data, and replay processing control means, said replay processing control means being operable when the system receives said analog signal, and having an input from said decoder means and an output to said digital storage means for instructing said digital storage means to replay the entire digital signal to ensure that the entire digital signal is used for communication.

2. A data receiver system as claimed in claim 1 wherein said symbol acquisition means comprises positive frequency filter means having an input connected to the output of said digital storage means, said positive frequency filter means generating in-phase and quadrature components of said digital signal, in-phase slider means having respective inputs for receiving said phase and quadrature components and respective outputs for passing said correctly timed symbols, said respective phase slider outputs forming the input to the symbol acquisition control means and the decoder means.

3. A data receiver as claimed in claim 2 including equalizer means located between the outputs of said phase slider means and decoder means to compensate for signal distortion, equalizer control means connected between said decoder means and said equalizer means constituting means effective to monitor said decoder output and to adjust said equalizer means to compensate for distortion in said decoded digital data.

4. A data receiver system as claimed in claim 1 including equalizer means located between said symbol acquisition means and said decoder means to compensate for signal distortion and equalizer control means connected between said decoder means and said equalizer control means constituting means effective to monitor said decoder output and to adjust said equalizer means to compensate for distortion in said decoded digital data.

5. A data receiver as claimed in claim 2, wherein each of said phase slider means includes digital filter means for receiving respectively said in-phase and quadrature components, and read-only-memory (ROM) means containing digital filter coefficients for use in said digital filter means, said digital filter coefficients being selected to optimise the interpolation by said symbol acquisition means, and the digital filter means having an output connected to said symbol acquisition control means for controlling the symbol acquisition means to maintain correct symbol timing.

6. A data receiver system as claimed in claim 1 implemented on a single integrated circuit.

7. A data receiver system for processing a received analog signal comprising a burst of data encoded with a plurality of symbols, the data receiver system comprising:

input means for receiving the analog signal;

sampling means associated with the input means for sampling the analog signal, said sampling means being coupled to asynchronous clock means connected to drive the sampling means;

analog to digital converter means connected to the output of the sampling means for digitizing said sampled analog signal to provide a digital signal;

digital storage means connected to the output of the sampling means for storing said digitized data therein;

positive frequency filter means having an input connected to the output of said digital storage means, said positive filter frequency means generating in-phase and quadrature components of said input signal;

a pair of phase slider means, each having a respective input connected to a respective output of the positive frequency filter means, said phase slider means to acquire said symbols from said digital signal, phase slider control means having inputs formed by respective outputs of said phase slider means, said phase slider control means constituting means effective to obtain correctly timed symbols by interpolation, said phase slider control means including digital filter means for receiving said in-phase and quadrature components, and read-only-memory (ROM) means containing digital filter coefficients for use in said digital filter means, said digital filter coefficients being selected to optimise the interpolation of said symbol acquisition means, and the digital filter means having an output connected to said phase slider control means for controlling the phase slider means to maintain correct symbol timing;

equalizer means having inputs connected to the outputs of the phase slider means, said equalizer means compensating for distortion in said correctly timed symbols, decoder means connected to the output of the equalizer means for generating decoded digital data from said correctly timed symbols, said decoder means having an output for outputting said decoded data, and replay processing control means, said replay processing control means being operable when the system receives said analog signal, and having an input from said decoder means and an output to said digital storage means to enable the replay of the entire digital signal to ensure that the entire digital signal is used for communication.

8. A system as claimed in claim 7 wherein the system is implemented on a single integrated circuit.

9. A data receiver system for receiving an analog signal containing data comprising input means for receiving the analog signal, sampling means associated with the analog input means for sampling the analog signal, asynchronous clock means connected to said sampling means for driving the sampling means, means for providing a digital signal from the sampled analog signal, storage means connected to the sampling means for storing said digital signal, first signal processing means for receiving the output of the storage means, said first signal processing means for processing the digital signal in accordance with a first set of predetermined algorithms based on inverse interpolation to estimate correct symbol timing and to use said estimate of correct symbol timing to recover said signal by interpolation, replay processing control means having an output connected to another input of the storage means and another input of the first signal processing means said replay processing control means to enable the replay of a entire digital signal for communication, output data being obtained from an output of the first signal processing means.

10. A system as claimed in claim 9 wherein said system includes variable channel equalization means, said variable channel equalization means being connected between the storage means and the first signal processing means such that the variable channel equalization means receives the output of the storage means and provides the input for the first signal processing means, said variable channel equalization means also being connected to the replay processing control means.

11. A system as claimed in claim 10 wherein the system includes carrier signal demodulating means, connected between the channel equalization means and the first signal processing means, the carrier signal demodulating means being connected to the replay processing control means.

12. A system as claimed in claim 11 wherein the first signal processing means is an interpolation detector, said interpolator detector operating in accordance with three predetermined algorithms based on Lagrangean Interpolation.

13. A system as claimed in claim 12 wherein the variable channel equalization means is a moving tap adaptive equalizer, said equalizer being operable in accordance with a predetermined algorithm.

14. A method of processing transmitted data, said transmitted data being encoded in symbols representative of binary codes, said method comprising:
 sampling asynchronously an analog input signal and obtaining analog samples therefrom;
 digitizing said analog samples to provide digital samples;
 storing the digital samples in a storage medium;
 reading out a portion of the stored digital samples and processing said portion to obtain correctly timed symbols said processing including replaying a predetermined number of said digital samples;
 equalizing said correctly timed symbols to compensate for signal distortion and;
 decoding the equalized symbols to produce binary coded data.

15. A method of processing data as claimed in claim 14, including the step of playing the entire digital sample from said storage medium to use all the transmitted data for communication when the transmitted data is in data bursts.

16. A method of processing data as claimed in claim 15 including the step of processing said data between received and stored data bursts.

17. A method of processing transmitted data bursts in a digital receiver comprising:
 sampling an analog input signal asynchronously and obtaining analog samples therefrom;
 converting the analog samples into digital samples;
 storing the digital samples in a storage medium;
 reading out a portion of the stored digital samples and processing said portion, said processing comprising the steps of replaying a predetermined number of said digital samples, each having a magnitude, and acting on the value of said magnitude for each sample in said predetermined number in accordance with a first predetermined algorithm to produce a value of a first parameter;
 using said first parameter value and a second predetermined algorithm to calculate a value of a second parameter for each sample in said predetermined number;
 processing said averaged values of said first parameter in accordance with a third predetermined algorithm to maintain said first parameter within predetermined limits within the range defined by a given sample, said third predetermined algorithm causing said first parameter to move by one sample in one of a set of forward and backward directions and after said processing;
 playing the entire data burst transmission to obtain a data output.

18. A method as claimed in claim 17 wherein said data output is obtained between said data bursts.

19. A method as claimed in claim 17 wherein the first parameter is the correct sampling time.

20. A method as claimed in claim 19 wherein said second parameter is the value of the signal at the correct sampling time.

21. A method as claimed in claim 19 wherein the first predetermined algorithm is an iterative inverse Lagrangean interpolation.

22. A method as claimed in claim 21 wherein the second predetermined algorithm is obtained by Lagrangean interpolation.

23. A method as claimed in claim 22 including prior to the step of processing the stored digital samples, the step of equalizing said stored digital samples using fractional tap spacing to produce an equalized digital sample, each tap spacing having a weight associated therewith.

24. A method as claimed in claim 23 wherein said predetermined sample is of a length of about 100 bits and is replayed a predetermined number of times, and after each replay, said method including the steps of retaining said weights for the next replay of said predetermined number of samples, and after carrying out the predetermined number of replays;
 retaining said weights for the playing of the entire data burst.

25. A method as claimed in claim 24 wherein replaying is repeated for said predetermined number of samples until the step of equalizing becomes convergent.

26. A method as claimed in claim 17 wherein said data bursts are encoded on a carrier signal, including the step of removing the carrier signal from the digital samples.

27. A method as claimed in claim 26 wherein, after the step of equalizing said digital samples, said method includes the step of removing said carrier signal from the digital samples.

* * * * *